United States Patent [19]

Borberg et al.

[11] Patent Number: 5,247,488

[45] Date of Patent: Sep. 21, 1993

[54] APPARATUS AND METHOD FOR THE ELECTRO ACOUSTICAL MEASUREMENT OF THE ANGULAR DIRECTION OF PROJECTILES PASSING IN FLIGHT AT AIR-TOW-TARGETS

[75] Inventors: Hartmut Borberg, Munich; Bernhard Obrecht, Weilheim, both of Fed. Rep. of Germany

[73] Assignee: Ingenierburo fur Elektro-Mechanische Technologien Dipl-Ing Hartmut Euer, Penzberg, Fed. Rep. of Germany

[21] Appl. No.: 934,962

[22] Filed: Aug. 25, 1992

[30] Foreign Application Priority Data

Sep. 2, 1991 [DE] Fed. Rep. of Germany ....... 4129447

[51] Int. Cl.$^5$ .................. G01S 11/14; G01S 3/80; F41J 9/10

[52] U.S. Cl. .................. 367/124; 367/906

[58] Field of Search .............. 367/906, 118, 124; 273/372

[56] References Cited

U.S. PATENT DOCUMENTS

3,778,059 12/1973 Rohrbaugh et al. ............... 367/906
5,023,847  6/1991 Lee .................................. 367/906

Primary Examiner—Daniel T. Pihulic
Attorney, Agent, or Firm—Parmelee, Bollinger & Bramblett

[57] ABSTRACT

Apparatus and method for the electro-acoustical measurement of the angle direction of passing projectiles at air-tow-targets, wherein at least three acoustical sensors are equidistantly positioned on a fixed sensor ring which is supported by the tow-target, wherein the arrival times of the waves of the projectiles are electronically measured by means of the several sensors.

20 Claims, 1 Drawing Sheet 5,247,488

APPARATUS AND METHOD FOR THE ELECTRO ACOUSTICAL MEASUREMENT OF THE ANGULAR DIRECTION OF PROJECTILES PASSING IN FLIGHT AT AIR-TOW-TARGETS

FIELD OF THE INVENTION

The invention concerns an apparatus for the electro acoustical measurement of the angular direction of projectiles passing with supersonic speed in flight air-tow-targets. Such kind of tow-targets are used for the exercising shooting onto flying targets, wherein a shot receiving sensor means installed within the tow-target recognizes the distance of the passage and the direction of passing projectiles indicating them as a shot area sign or shot picture sign on the earth.

Such kind of air-tow-targets are used as so-called "solid" tow-targets,(i.e. rigid tow bodies) or "smooth" tow-targets, (i.e. tow bags and tow flags). In this connection there are targets having a stable flight position, for instance those which are towed in their center of gravity, and there are targets having not a stable flight position, for instance rotating targets which are towed at their noses.

DESCRIPTION OF THE PRIOR ART

The practically most important methods of measurement for the destination of the shot location are based on acoustical principles of measurement. The supersonic projectile passing the flight target is provided with a conically configured shockwave, the so-called Mach-cone. The local and temporal course of the shockwave is characterized by a steep course of pressure over the static pressure (front shock), a generally linear decrease under the static pressure and a second steep pressure increase backwardly to the static pressure (tail shock). This course of pressure is designated because of the configuration of the oscillogram (similar to the letter N) as projectile-N-wave. The pressure amplitudes of the front shock and the tail shock of the projectile-N-wave as well as the temporal distance between the front shock and the tail shock are known functions of the distance from the course of the projectile.

On the basis of these physical conditions a technique is known and introduced according to which the shortest distance of the passage of the projectile from the target (shot radius) will be defined by the measurement and electronic calculation of the pressure amplitude of the projectile-N-wave. This method of measurement allows the counting of the shots in circle-like shot areas surrounding the air target in accordance with the rings of a firing disc.

The determination of the shot picture i.e. the single shot points and their coordinates on a virtual target disc is not possible on the basis of this shot area method. For a realistic training, however, not only the sum of the shots within the shot areas should be known but also the real shot picture.

Measurement procedures for ascerting shot pictures on the basis of the position of several sensors within the space (sensor-array) are known. These known methods, however, have not become practically important, because in order to get a satisfactory precision in measurement large sizes of the sensor-arrays are necessary which do not comply with the size and configuration of the air-tow-targets.

SUMMARY OF THE INVENTION

One of the objects underlying the invention is therefore to provide a method of measurement for gaining shot pictures which is based on the above-mentioned amplitude evaluating measurement of the shot radius and which completes this method by adding thereto an independent measurement of the shot angle. In this connection a further object to be solved should be seen therein to realize a shot picture display by means of the shot radius and the shot angle which together form the two-dimensional radial coordinates of the shot point.

A still further object of the invention is to provide an apparatus for the measurement of the shot angle which can be integrated in a simple way in the construction of hard and soft tow-targets.

DESCRIPTION OF THE DRAWING

An advantageous embodiment of the subject invention is shown by FIG. 1 of the drawing. The sensor ring 1 is provided with eight acoustical sensors 2.1 to 2.8 corresponding to a coarse angle-resolution of 45°. The signals of the acoustical sensors are transmitted to the evaluating electronic means 3 the output signal 4 thereof indicates the required shot angle 5. A passing projectile 6 takes an acoustical shock wave cone 7 with it which arrives at the sensor ring under the shot angle 5. Under the precondition that the tow-target does not fly in a stable flight condition, a vertical sensor 8 is arranged, consisting of a mass pendulum 9 and an absolute-angle sensor 10 on a mounting support 11. The signal of the absolute-angle sensor 10 is transmitted to the evaluating electronic means 3.

DETAILED DESCRIPTION OF THE INVENTION

Figure 1:
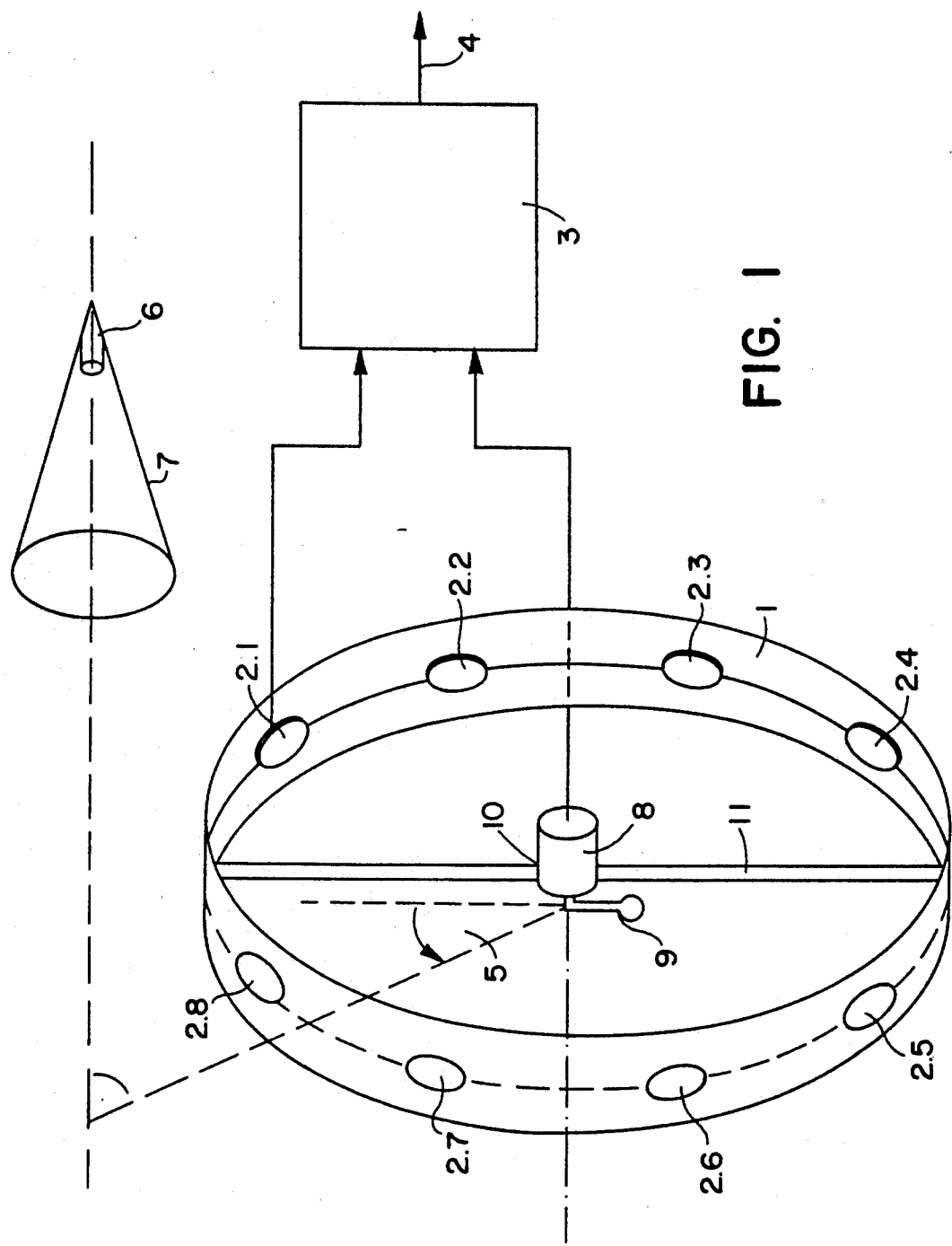

These and other objects are advantageously solved by the invention by means of at least three acoustical sensors positioned in equal distances on a fixed circular ring which may be called sensor ring. The sensor ring is transported together with the tow-target. The axis of the sensor ring is horizontally positioned dependent on the line of flight. The rotational orientation of the sensor ring with respect to this axis is known, for instance from the stable line of flight of the tow-target which is towed within its center of gravity.

The single shot points of the projectile-N-wave at the single sensors are electronically ascertained and allow a clear, calculatable conclusion with respect to incident direction of the sound wave and thus to the direction with respect to the axis of the projectile course, which is also the direction of the shot angle requested for.

The measurement faults are minimized according to the subject invention in case the maximum sensitivity of the acoustical sensors is in the range of supersonic frequencies.

According to the subject invention the determination of the requested direction of angle is gained by a rough-fine-procedure. The rough direction of angle is determined by the number of that acoustical sensor which at first ascertains the projectile-N-wave making the precondition that the sensors of the sensor ring are randomly numbered. The fine-direction of angle is calculated from the quotient of the sound arrival time difference between the already designated sensor and the sensors adjacent to it at left hand and right hand.

This evaluating procedure is not only simple but has also the advantage that it is because of the quotient evaluation procedure suited for any diameter of the sensor ring so that the signals of the sensor rings of different constructional sizes can be evaluated with the same electronic means. Moreover, the quotient evaluation procedure is with respect to the accuracy of the measurement rather insensitive for differences of the shot direction which have an important influence on the sound arrival time differences themselves.

In order to not disturb the sound propagation in the air by influences caused by body sound the sensor ring is manufactured according to the subject invention of a material dampening the body sound, for instance plastic material, and the sensors are fixed in the sensor ring by glueing or moulding them with a similar material.

In order to keep the air resistance of the tow-target and the disturbing noises because of flow turbulences as low as possible the sensors are located at the surface such that they do not raise any turbulences, i.e. they are mounted in the surface of the sensor ring such that no part of the sensors extends beyond its surface.

This measurement means for the shot angle has the advantage that it can be integrated in a simple way in cylindrical constructional elements of the tow-target. According to an especially advantageous feature of the subject invention the sensor ring of tow-target bodies can be an integral part of the hull cylinder itself. In case of using tow-target bags the sensor ring may be part of the wall of the front side electronic cylinder.

If the tow-target does not have a stable flight condition, for instance if a target body which is towed at its nose or a tow-target bag rotates about the dragging cable axis the sensor ring is continuously changing its position with respect to the vertical axis in an unknown manner causing continuous change of the reference angle Zero for the determination of the shot angle. The shot angle data received under the above-mentioned conditions cannot be used without additional determination of the real position of the sensor ring.

In order to measure the position angle of the sensor ring with respect to the vertical axis a vertical sensor is provided in accordance with the invention. This vertical sensor is established such that an absolute-angle sensor is used in a fixed connection to the sensor ring provided at its rotational axis with a mass pendulum. The electric output signal of the absolute-angle sensor indicates directly the orientation of the pendulum with respect to the sensor ring and thus the position of the sensor ring with respect to the vertical axis. The absolute-angle sensor may for instance be a potentiometer, angle-encoder or inductive alternating-current-rotational indicator.

Instead of an absolute-angle sensor an incremental angle sensor may be provided as well indicating angle steps of movement. The determination of the absolute angle position is made in a manner known per se by means of an interconnected counting electronic means.

If the tow-target is rotating regularly and uniformly which is generally the case in practice it is sufficient according to the subject invention, if the vertical sensor is a pendulum provided only with a reference mark-sensor. The reference mark-sensor may be realized by means of a light sensitive device or an induction-approach sensor. On every passage through the rotational angle zero the reference mark-sensor delivers a short time zero-impulse coded with the rotational direction, for instance a positive impulse in case of the rotational direction right hand and a negative impulse in case of the rotational direction left hand. An actual angle of rotation can be thereafter gathered from the quotient of the time since the last zero impulse and the time between two zero impulses.

According to a further constructional simplification of the subject invention the pendulum of the above mentioned zero impulse delivering means is replaced by an annular track and a freely running ball, roll or disc. At a point of the track a light sensitive means or an induction approach sensor is positioned as a reference mark-sensor ascertaining the time of the passage and the direction of passage of the ball, roll or disc.

We claim:

1. Apparatus for the electro-acoustical measurement of the angle direction of projectiles passing in flight air tow targets at supersonic speed, characterized in that at least three acoustical sensors are substantially equidistantly arranged in a sensor ring and the time or arrival at the several sensors of a pressure wave having an initial steep pressure rise over the static pressure, a substantially linear pressure decrease to below static pressure, and a second steep pressure rise substantially to the static pressure is electronically ascertained and used to evaluate and indicate the angular direction with respect to the flight course axis of the projectile.

2. Apparatus according to claim 1, characterized in that the sensor ring supporting the acoustical sensors has an annular configuration and is manufactured of a sound dampening material.

3. Apparatus according to claim 1, characterized in that the acoustical sensors are moulded or glued to the sensor ring by means of a sound dampening material.

4. Apparatus according to claim 1, characterized in that the acoustical sensors are located within the sensor ring such that their surfaces are smooth with the surface the sensor ring.

5. Apparatus according to claim 1, characterized in that the maximum sensitivity of the acoustical sensors is within the supersonic-frequency range.

6. Apparatus according to claim 1, characterized in that a vertical sensor is arranged in a fixed connection to the sensor ring, which vertical sensor ascertains the rotational position of the sensor ring with respect to the vertical line.

7. Apparatus according to claim 6, characterized in that the vertical sensor is a pendulum at an absolute-angle sensor.

8. Apparatus according to claim 6, characterized in that the vertical sensor is a pendulum at an incremental-angle sensor.

9. Apparatus according to claim 6, characterized in that the vertical sensor is a pendulum provided with a reference-mark sensor.

10. Apparatus according to claim 6, characterized in that the vertical sensor is an annular track provided with a free running ball, roll or disc as well as with a reference-mark sensor.

11. Method for the electro-acoustical measurement of the angular direction of projectiles passing an air flow target in flight by means of an apparatus according to claim 1, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

12. Method for the electro-acoustical measurement of the angular direction of projectiles passing an air tow target in flight by means of an apparatus according to claim 10, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

13. Method for the electro-acoustical measurement of the angular direction of projectiles passing an air tow target in flight by means of an apparatus according to claim 2, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

14. Method for the electro-acoustical measurement of the angular direction of projectiles passing an air tow target in flight by means of an apparatus according to claim 3, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

15. Method for the electro-acoustical measurement of the angular direction of projectiles passing an air tow target in flight by means of an apparatus according to claim 4, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

16. Method for the electro-acoustical measurement of the angular direction of projectiles passing an air tow target in flight by means of an apparatus according to claim 5, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

17. Method for the electro-acoustical measurement of the angular direction of projectiles passing an air tow target in flight by means of an apparatus according to claim 6, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

18. Method for the electro-acoustical measurement of the angular direction of projectiles passing an air tow target in flight by means of an apparatus according to claim 7, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

19. Method for the electro-acoustical measurement of the angular direction of projectiles passing an air tow target in flight by means of an apparatus according to claim 8, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

20. Method for the electro-acoustical measurement of the angular direction of projectiles passing an air tow target in flight by means of an apparatus according to claim 9, characterized in that the required direction of angle is determined by a rough-fine-procedure, wherein the rough-angle direction is determined by means of the number of the acoustical sensor which is the first to detect a pressure wave having an initial steep pressure rise over the static pressure, a substantially linear pressure decrease to below static pressure, and a second steep pressure rise substantially to the static pressure, wherein the fine angle direction is determined from the quotient of the sound arrival time differences at the two adjacent acoustical sensors.

* * * * *